UNITED STATES PATENT OFFICE.

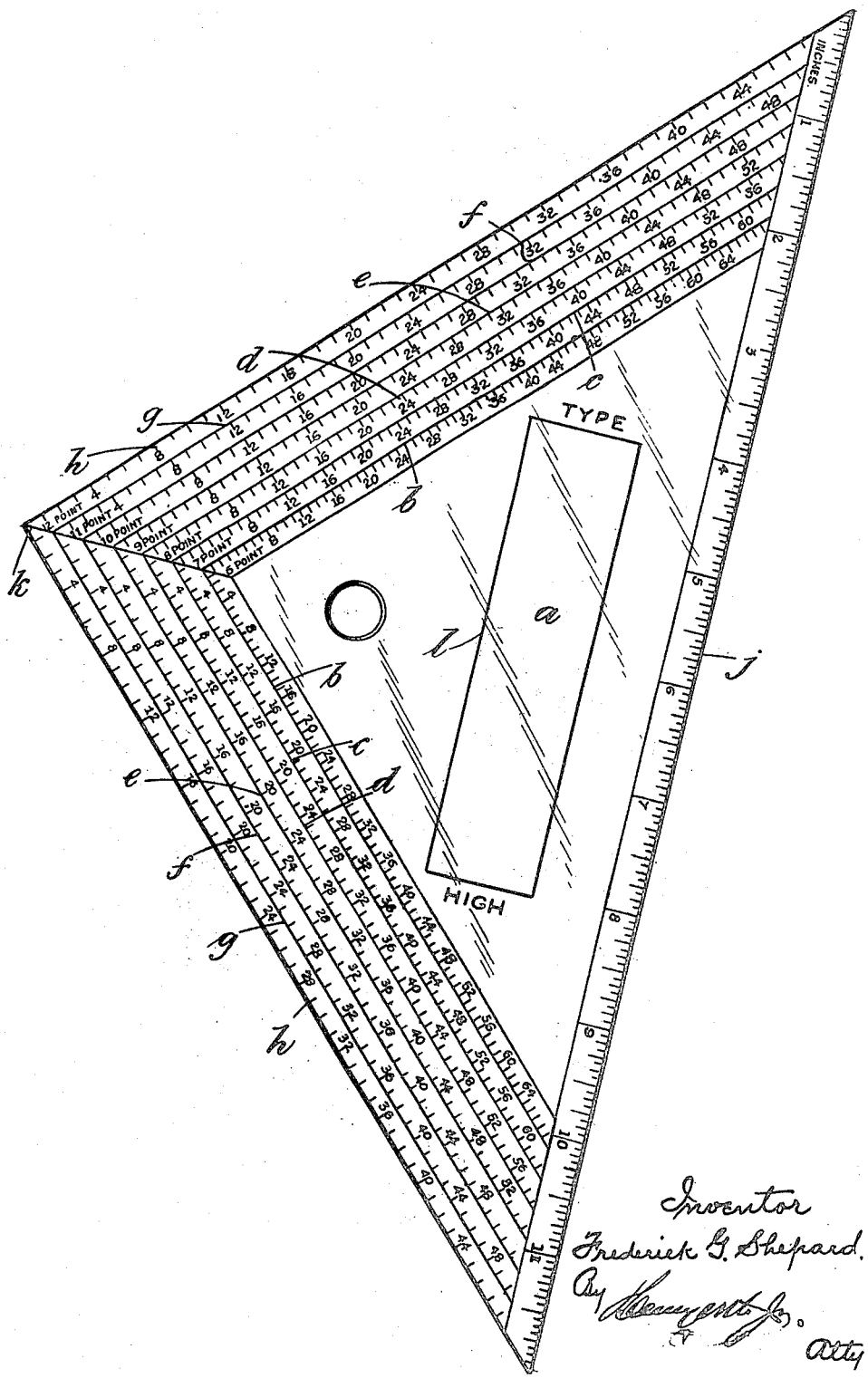

FREDERICK GEORGE SHEPARD, OF PECKHAM, LONDON, ENGLAND.

PRINTER'S TYPE GAUGE.

1,417,208. Specification of Letters Patent. Patented May 23, 1922.

Application filed March 25, 1921. Serial No. 455,462.

*To all whom it may concern:*

Be it known that I, FREDERICK GEORGE SHEPARD, a subject of the King of Great Britain, residing at 17 Cicely Road, Peckham, London, England, have invented a certain new or Improved Printers' Type Gauge, of which the following is a specification.

This invention relates to a printers' type gauge and has reference to type gauges that are adapted for enabling the quantity of type set to be ascertained by means of scales which measure the length and breadth simultaneously of the composition in suitable units, such as the number of ems.

One object of the present invention is to provide a transparent type gauge device bearing the said scales and adapted for measuring composed type areas at sight.

Another object is to provide a gauge adapted for measuring the area of a composition of any one of a number of different types. Thus the invention avoids the use of a number of gauges each of which is appropriate to a definite kind of type.

A further object is to provide a type gauge device which combines with it the features of accessory instruments such as a foot or like rule, set square and a type-high gauge.

One embodiment of the present invention is illustrated in the annexed drawing forming part of this specification, the said drawing showing an improved gauge device in plan.

Referring to the drawing, $a$ is a triangular plate of celluloid or other suitable transparent material having the form of a forty-five degree triangle as commonly used by draughtsmen. Along the base and perpendicular edge portions are marked the scales $b\ b$ to $h\ h$ the said marking being done in any suitable manner, as for example, by scoring the surface as is usual in the marking of celluloid protractors, for instance. Along the hypotenuse edge portion, there may be marked off an inch scale or other scale of linear measurement $j$.

A line $k$ is drawn bisecting the right angle and perpendicular to the hypotenuse, and as will be seen from the drawing, each of the scales $b\ b$ to $h\ h$ starts from this line and extends to the scale $j$.

The scales $b\ b$ may be gauges of 6 point type, or nonpareil type, the scales $c\ c$ may be gauges of 7 point type, or minion type, and so on outwardly to the scales $h\ h$ which may be gauges of 12 point type, or pica type.

In use, the gauge device is laid upon the type area to be measured with its base or perpendicular edge along one side edge of the area and its perpendicular or base along the top or bottom edge of the said area. The gauge device is adjusted so as to bring the proper scales in the series $b$ to $h$ into alignment with the appropriate side of the area according to the kind of type constituting the composed area. Thus, the point of intersection of the chosen scale with the line $k$ will coincide with the appropriate corner of the area to be measured. The quantity of type in the area may now be estimated in the usual manner.

Parallel with the hypotenuse, there may be a rectangular type-high gauge $l$. This gauge $l$ is useful for enabling the height of printing blocks and so on, to be tested, measured or gauged as the width of the gauge $l$ is type high.

The inch scale may be used for example for ascertaining the weight of type on a page or composition of given area the weight of a square inch of type being known.

I claim:—

A type gauge consisting of a transparent right angled triangle formed with a plurality of type gauge scales in parallel relation along its base and with a similar plurality of scales in parallel relation along its perpendicular side, the said scales of each plurality starting from a line bisecting the right angle of the triangle and extending towards the hypotenuse substantially as set forth.

FREDERICK GEORGE SHEPARD.